Oct. 30, 1951 F. J. FURMAN 2,573,561

STORAGE UNIT

Filed June 25, 1949 4 Sheets-Sheet 1

INVENTOR
FRANK J. FURMAN
BY Robert S. Dunham
ATTORNEY

STORAGE UNIT

Filed June 25, 1949 4 Sheets-Sheet 2

INVENTOR
FRANK J. FURMAN
BY Robert S. Dunham
ATTORNEY

INVENTOR.
FRANK J. FURMAN
BY Robert S. Dunham
ATTORNEY.

Oct. 30, 1951 F. J. FURMAN 2,573,561

STORAGE UNIT

Filed June 25, 1949 4 Sheets-Sheet 4

INVENTOR.
FRANK J. FURMAN

BY Robert S. Dunham

ATTORNEY.

Patented Oct. 30, 1951

2,573,561

UNITED STATES PATENT OFFICE 2,573,561

STORAGE UNIT

Frank J. Furman, Endicott, N. Y., assignor to International Business Machines Corporation, New York, N. Y., a corporation of New York Application June 25, 1949, Serial No. 101,473

12 Claims. (Cl. 235—61.6)

This invention relates to storage devices and to a system for the control thereof; more particularly, the invention relates to an electrical storage device for use in connection with electric accounting and computing machines, and it has particular utility in accounting and computing systems which operate under control of perforated record cards.

Information from a source such as a perforated card may be sensed concurrently, or it may be sensed column by column. Accordingly, provision must be made for either concurrent entry or column by column entry of data from a record card into a data storage device. Information read out from the storage device may be read out of storage by either a concurrent readout or a column by column readout, depending upon the type of device which is to receive the stored information. Accordingly, storage devices of this class must be adapted for either concurrent readout or column by column readout.

Concurrent entry and readout sometimes referred to as digit by digit entry and readout have reference to operations wherein all like digits of a given field are entered in the storage device simultaneously and later read out of storage simultaneously. Column by column entry and readout, on the other hand, have reference to operations wherein all information in a single column irrespective of the value of the designations therein are entered in the storage device at one time and later read out of the device at one time.

It is, therefore, the principal object of this invention to provide an improved storage device which is adapted for either column by column or concurrent entry with either column by column or concurrent readout.

It is a specific object of the invention to provide a storage device having a storage zone which includes a plurality of normally open contact units representative of significant digits and a normally closed contact unit representative of a zero, and in connection therewith independent means for closing the contact units representative of significant digits together with means operative by each of the independent operating means for opening the contact unit representative of zero.

In its present embodiment, the storage device comprises a plurality of data storage zones, each one consisting of a plurality of normally open contact units in substantial alignment with corresponding units of an adjacent zone. Contact operating bails are mounted in spaced alignment with aligned contact units of adjacent storage zones. Between the contact operating bails and the contact units of each of the respective zones is disposed a contact operating assembly, which has a plurality of sliding interposers mounted therein in offset relation with respect to the contact operating bails and the contact units of their respective storage zones. The invention contemplates the provision of means for first selectively moving the contact operating assemblies to bring the interposers thereon into alignment with the contact operating bails and the underlying contact units, and for thereafter selectively operating the contact operating bails for depressing and closing related interposer units. In operation electric impulses are impressed on closed contact units, permitting the flow of operating current to devices of the system in which the storage unit is located.

Further objects, advantages and features of the storage device and the system for its control will become clear as the following specification is read in light of the drawings in which Figure 1 is a plan view of the storage unit forming the principal electromechanical feature of the invention;

Figure 1:
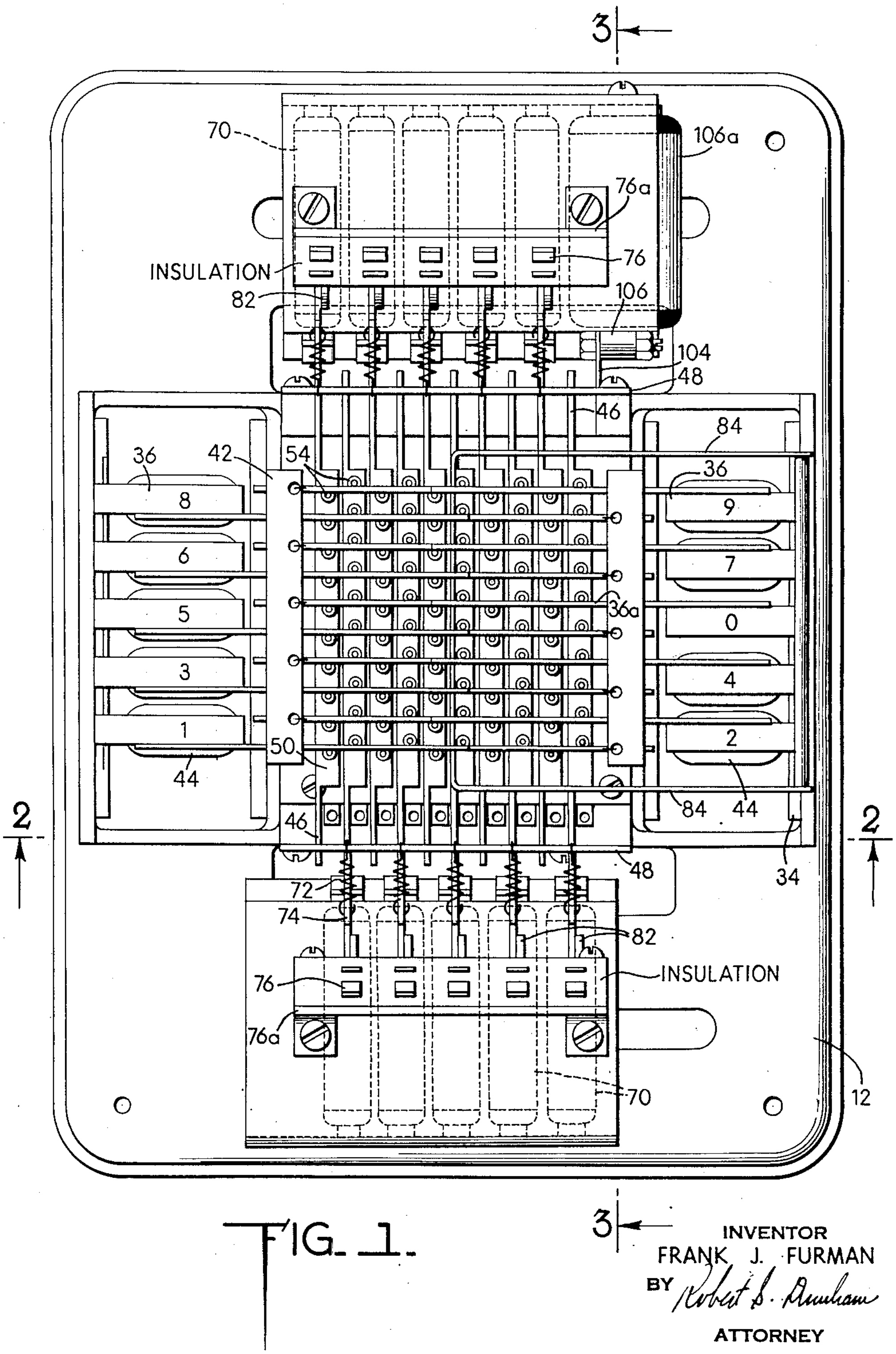
Figure 3:
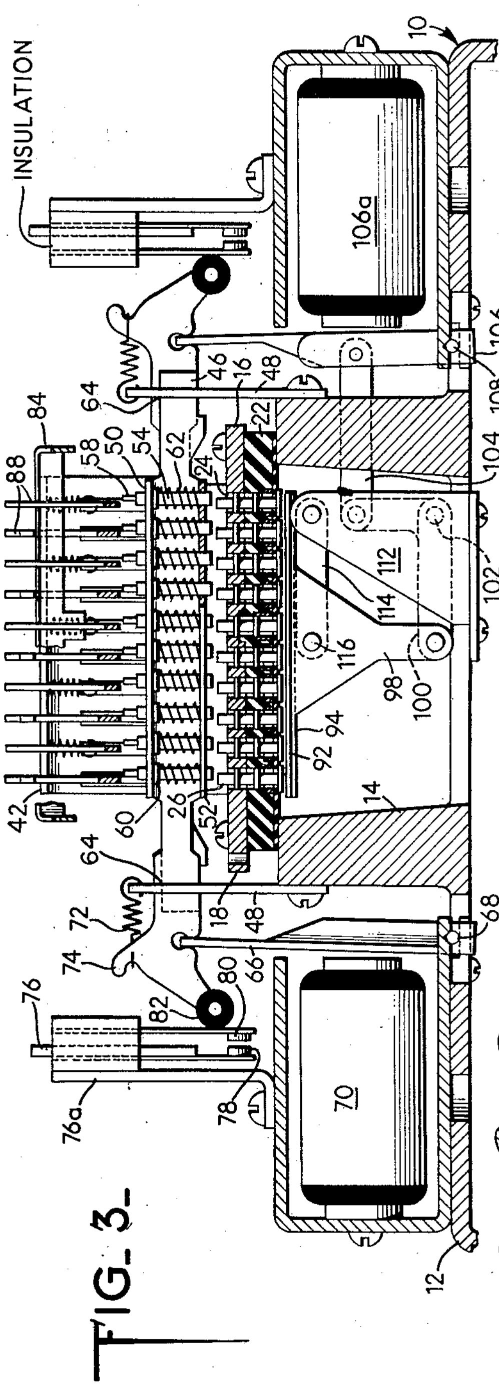
Fig. 3 is a sectional view taken on line 3—3 of Fig. 1.
Figure 2:
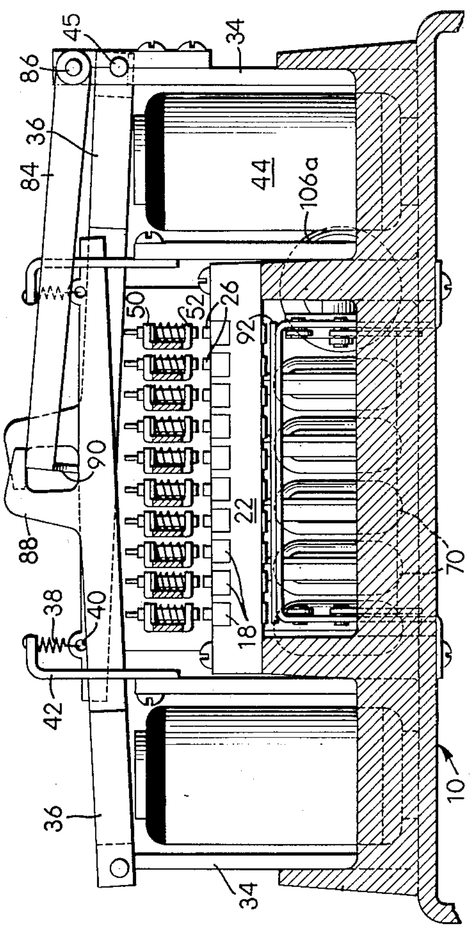
Fig. 2 is a sectional view taken on line 2—2 of Fig. 1.

The storage mechanism is mounted on a base frame 10 having laterally extending flanges 12 and inwardly spaced upstanding supporting flanges 14. Attached to the upper faces of the supporting flanges is a contact plate 16 which consists of a plurality of spaced, substantially parallel face conductor strips 18 and a plurality of spaced, substantially parallel intersecting base conductor strips 20. The face strips 18 and the base strips 20 are separated from each other by a body of insulating material 22 which serves as a mounting base for the strips. The contact plate has provided therein through passages 24 at each point at which a face strip and a base strip intersect. Each such passage therefore provides a pair of spaced, mutually insulated conducting surfaces with which a contact pin 26 is adapted to cooperate to electrically bridge the spaced conducting surfaces and thereby establish a circuit path through the contact unit. Each contact unit, i. e. a through passage and its associated contact pin, constitutes a storage point, and each group of such units along the length of a conductor strip 18 constitutes a storage zone. The contact units of a zone are herein illustrated as being substantially equally spaced, and the units of one zone are in substantial alignment with the units of an adjacent zone. The number of contact units in each zone, and the number of zones in the storage device may be varied to satisfy the requirements of the control system in which the device is used.

When the storage device is to be used in a perforated record card controlled system, for example, the number of contact units in each storage zone will be ordinarily ten or twelve, depending on whether the control cards have numeric or alphabetic data punched therein. The number of storage zones will depend on the number of columns of a perforated card from which data is to be stored.

Since the operation of the storage device will be described in connection with numeric storage from a perforated record card, there have been illustrated herein ten contact units in each storage zone to provide ten storage points corresponding to the ten columnar, numeric index point positions of a record card. The drawing illustrates a storage device having ten storage zones, thereby adapting the device to storage from ten card columns. For purpose of description, the storage points of a storage zone may be regarded as corresponding to the index point positions of a card column, and the aligned storage points of a plurality of storage zones may be regarded as corresponding to the digital index point positions of a record card. The terms "columnar" and "digital" may, therefore, be used herein for convenience in description without any limiting effect on the invention.

Each contact pin 26 has a pair of spaced, ring-like ribs 28 and 30 which are adapted to establish a circuit path from the face bar 18 to the base bar 20 of its related contact unit. The spacing of the ribs 28 and 30 is such that the upper rib 28 is always in contact with the conducting strip 18, irrespective of the position of the pin within its contact passage. When the pin is disposed in its upper on non-depressed position, the lower rib 30 is in contact with the insulating body 22 and therefore no circuit can be made through the contact unit. However, when the pin 26 is depressed, the lower rib 30 of the pin will be in contact with the base contact strip 20 and a circuit is then closed through the face strip 18, the upper rib 28, the body of the pin, the lower rib 30, and the base strip 20. The pins 26 are axially slotted to accommodate a bowed spring 32 which bears against the walls of the through passage 24 with sufficient force to hold the pins in any given adjusted position within the passage.

Figure 4:
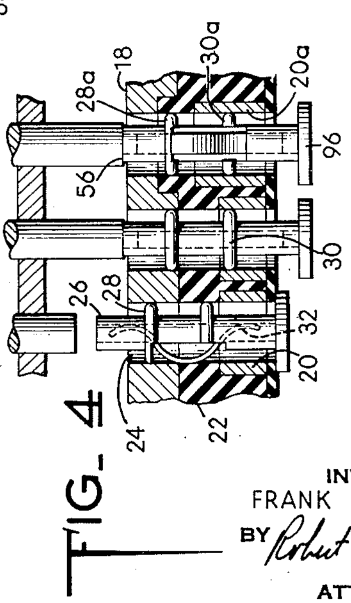
Fig. 4 is a detail view of three sliding contact units.

It should be noted at this point that all of the contact units of a storage zone representative of the digits 1 through 9 are open when the pins are in their non-depressed position and closed when the pins are depressed. On the other hand the unit of each storage zone representative of zero, as seen at the right in Fig. 4, is so arranged as to be closed when the pin is in its upper or non-depressed position and open when the pin is depressed. The base strip 20 at the zero position has a longer axial surface so that the rib 30*a* of the zero pin lies in contact with the contacting surface 20*a*, irrespective of the axial position of the zero pin. On the other hand, the passage through the face strip 18 is axially shorter so that the upper contact rib 28*a* of the zero pin is in contact with the face strip 18 only when in its non-depressed position. This arrangement results in closed circuit paths through the zero positions of each storage zone unless the zero pin is depressed, and normally results, as will be more fully pointed out hereinafter, in the registering of a zero in any column in which no significant digit is stored. The zero pin of the several storage zones is shown in Fig. 1 as being disposed between the 5 and 6 digit positions.

When the storage device is used in a control system, the contact pins 26 are normally in their upper or open position, and in order to store a digit it is necessary to depress the appropriate contact pin, thereby closing a circuit through the contact element. Operating mechanism responsive to source material has, therefore, been provided for effecting the depression of selected pins.

Extending upwardly from oppositely disposed, laterally extending base flanges 12 are a plurality of supporting brackets 34, and pivoted to the top of these brackets are contact operating digit bails 36. Alternate bails are pivoted to the brackets at one side of the base, and the remaining bars are pivoted to the brackets at the other side of the base. A bail 36 is common to a given digital position of the several storage zones. The bails 36 are disposed above the upper, free ends of the contact pins 26 in alignment therewith but in spaced relation thereto. Each bail is held in a normally elevated position by means of a spring 38 which has one end thereof attached to a bail eye 40 at the free end of the bail. The other end of the spring is attached to an overhanging supporting bracket 42 which is fixed in the base frame.

Each of the digit bails constitutes the armature of an associated digit magnet 44, which is vertically supported with its core disposed in proximity to its associated bail. It will be seen, therefore, when one of the magnets 44 is energized the core thereof will attract its digit bail 36 and rock the bail about its pivoted support 45.

As hereinabove noted the digit bails are spaced from the contact pins 26, and this spacing is sufficiently great that the bails themselves are ineffective to contact and operate the contact pins 26. There has, accordingly, been provided a plurality of contact operating assemblies, there being one such assembly for each storage zone. The contact operating assemblies are disposed in intersecting relation to the digit operating bails 36. Each contact operating assembly comprises a column bar 46 which is mounted for limited sliding movement in slots formed in guide brackets 48 which are attached to and extend upwardly from the upstanding base flanges 14. The central portions of the bars 46 have formed thereon a pair of confronting flanges 50 and 52. Mounted for sliding movement in aligned passages in the flanges of each column bar are a plurality of interposers 54 which are formed of insulating material. The number of interposers corresponds to the number of contact pins of the storage zone with which the contact operating assembly is associated. Each interposer has a contact pin operating face 56 which extends below the bottom face of the bottom flange 52, the opposite end of the interposer having formed therein a reduced portion 58 with which the digit bails 36 are adapted to engage for sliding the interposers into operative contact with their associated contact pins. Each interposer has formed thereon a collar 60, which is adapted to bear against the lower face of the upper flange 50, thereby limiting the upward movement of the interposers in the flange structure. Disposed between the interposer collar of each interposer 60 and the upper face of the bottom flange 52 is a coil spring 62 which serves to hold the interposers in their normal elevated position.

It is important to note that while the interposers of a given contact operating assembly correspond in number and spacing to the contact pins 26 of its associated storage zone, the normal position of the interposers is offset with respect to the digit bails and the contact pins. In particular, the upper reduced end 58 of each interposer is offset with respect to the vertical plane in which its associated digit bail operates. Therefore, the digit bail is ineffective to operate its associated interposers unless the interposers are moved into aligned position with the digit bails. Means has accordingly been provided to selectively reciprocate the contact operating column bars 46 to align the interposers with the digit bails and the contact pins. Herein, one end of each interposer bar has provided therein a notch 64 which is engaged by the free end of an armature 66 having a pivotal connection 68 with the base casting 10. Each armature has associated therewith a column magnet 70, which when energized, will attract the armature 66 to its core. As a result of such movement, the armature is rocked about its pivot 68 and the free end of the armature which rests within the notch 64 of the column bar will effectively reciprocate the column bar 46 a sufficient distance to align the interposers 54 with the digit bails 36 and the contact pins 26. When in this position the digit bails 36 may be selectively operated by energizing associated digit magnets 44, and the rocking movement of such bails into contact with aligned interposers will depress the interposers and consequently the underlying contact pins 26. In this manner selected contact units are closed and circuits through the contact plate are established. Alternate interposer assemblies are brought into operative alignment with the digit bails by movement toward one end of their associated storage zones, and the remaining assemblies are in operative alignment with their associated storage zone when shifted in the opposite direction.

Each column bar 46 is held in its normal offset position by means of a spring 72 which has one end thereof fixed to the upper free end of the associated bar guide 48 and the other end thereof to an ear 74 formed at the end of the bar.

It is to be noted that a column bar and its associated interposers must be held in aligned operative position with respect to the digit bails and the contact pins sufficiently long to permit the selective operation of one or more storage units of an associated storage zone. For this purpose there is provided for each column magnet a holding circuit having therein a circuit maker 76 which consists of resiliently mounted contact points 78 and 80. A circuit maker 76 is fixed to the base structure in proximity to the end of each column bar. Each column bar has an insulating operating roller 82 attached to the end thereof, and the roller 82 is adapted to contact the resilient mounting of the contact point 80 when the bar is shifted under the influence of its magnet. As a consequence, when a column bar 46 is shifted upon energization of its associated magnet, its operating roller 82 will contact the resilient leaf on which the contact point 80 is mounted and move the contact point 80 thereon in circuit making contact with the oppositely disposed contact point 78. As a consequence, a holding circuit, as will appear more fully hereinafter, will be established for the associated operating column magnet.

It will follow from the foregoing, therefore, that a column magnet 70 may be energized selectively to align the contact operating assembly thereof with the digit bails and the contact pins of the particular storage zone with which the assembly is associated. It also follows that selected ones of the digit magnets 44 may be energized to rock the associated digit bails 36 downwardly against the tension of the supporting springs 38, and that upon such rocking movement all interposers that have been shifted into alignment with such digit bails will be reciprocated to close their related contact units. By this mode of operation, digital information may be stored in any one of the storage points provided in the storage plate 16.

As hereinabove noted, the zero storage position of each storage zone is normally closed, that is to say, the contact pin at the zero storage point of each storage zone is normally in elevated position, thereby closing the circuit through that position as hereinbefore described. All of the digit bails representative of digits 1 through 9 have an associated operating digit magnet, but the zero bail is interconnected with the bails representative of significant digits so that the same is operated each time a significant digit is entered into a given column. When no such digit is entered into a storage column, the zero bail will remain inactive and the zero unit will remain closed. In order to insure the proper operation of the contact pins at the zero storage position, there is provided a generally U-shaped zero bail 84, which has the free ends thereof mounted for rocking movement about a pivot 86 in the end brackets 34 at one side of the device. The base of the zero bail U overlies the digit bails 36 and is engaged from above by hook-like extensions 88 formed in and extending upwardly from the digit bails. It will be seen, therefore, that whenever a digit bail is rocked about its mounting pivot, the hook-like extension 88 thereof will engage the upper edge of the zero bail and depress the bail. A zero pin operating bar 36*a* (Fig. 1) is mounted for rocking movement in manner similar to the significant digit bails 36 with the exception, of course, that it has no associated operating magnet. The U-shaped zero bail 84 has a downwardly projecting finger 90 which lies in contact with and which is adapted to operate the zero bar 36*a*. Consequently, when a significant digit is stored in any given column, the zero bar 36*a* will be operated to depress the zero contact pin of that storage unit. On the other hand, if no significant digit is stored, the zero pin of such column will remain in its circuit closing position, and a zero will be stored in that column for subsequent influence of the controlled device or devices.

Common means has been provided for restoring depressed contact pins into normal open circuit position. It is desirable that all pins be restored simultaneously, and consequently there has been provided herein means for simultaneously returning the contact pins to their normal position. A plate of insulating material 92 is positioned on an operating bracket 94, the latter being located within the upstanding base flanges 14 and in proximity to stop flanges 96 on the lower end of the contact pins. The plate is sufficiently large to extend over all of the storage positions of the storage plate, and it is so mounted that upward movement thereof into contact with the stop flanges 96 of the contact pins will effectively raise depressed pins and thereby restore them to normal position. The operating bracket 94 has a pair of downwardly extending legs 98, one at each end of the bracket, and the lower end of each leg has pivoted thereto a bellcrank 100 which is mounted for rocking movement about a pivot point 102. The opposite end of the bellcranks have pivoted thereto an operating link 104, the opposite end of which is pivoted to an armature 106. The armature 106 is mounted in the base casting 10 for rocking movement about a pivot 108, and the same has associated therewith a restoring magnet **106*a*. When the magnet 106*a* is energized, the armature 106 is attracted to its core and the bellcrank structure 100 is rocked about the pivots 102 in a clockwise direction. This, in effect, elevates the bracket structure 98 and presses the insulating sheet 92 into operative contact with depressed contact pins. Extending upwardly from opposite sides of the base casting are brackets 112 to the upper end of which are pivoted links 114, these links having an end pivoted on a stud 116 extending from the central portion of the downwardly extending bracket leg 98**. The movement of the restoring bracket is thereby held in substantial parallelism.

Since the storage device has been described as being adapted to control systems using perforated record cards as the control data, it is appropriate that the device be shown in connection with typical control systems.

Figure 5:
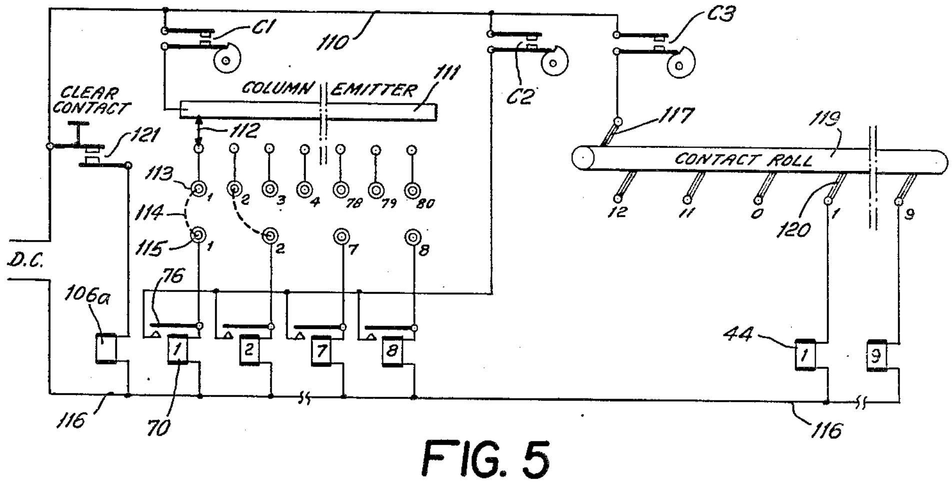
Fig. 5 is a wiring diagram showing the device oriented in a system for numeric column by column storage.

Fig. 5 of the drawings illustrates a wiring arrangement for the entry of data into the storage device in column by column fashion. Herein a cam contact C–1 will close each time that the perofrated record card advances a column in its column by column progression through a sensing station. The cam contact C–1 will close to permit a circuit to be completed to the column magnets. The circuit is completed from the line 110, through the now closed cam contact C–1, to a column emitter strip 111 through a column emitter 112, to a plug socket 113, through a plug wire 114, through an entry socket 115, and to the first column magnet 70. The column magnet so energized will remain energized by virtue of a holding circuit that is established from the line 110, through the now closed cam contacts C–2, through the now closed holding circuit maker 76, to the column magnet 70 of the first column and to the line 116. This operation is effective to shift the interposers of the first contact operating assembly into alignment with the contact pins 26 of the associated contact zone and with the digit operating bails 36 overlying the interposers.

As the digital holes in the perforated record card are sensed, circuits are completed to energize the digit magnets 44. A typical circuit is closed from the line 110, through the cam contact C–3, which closes after the cam contacts C–1 and C–2, a common brush 117, a contact roll 119, through the column one reading brush 120 and to the "1" digit magnet 44 and from thence to a line 116.

To restore contact pins 26 that have been closed by an operation such as the foregoing, a suitable clear key 121 is depressed to complete a circuit from the line 110, the clear key 121, the restoring magnet **106*a*, and the line 116**.

Figure 6:
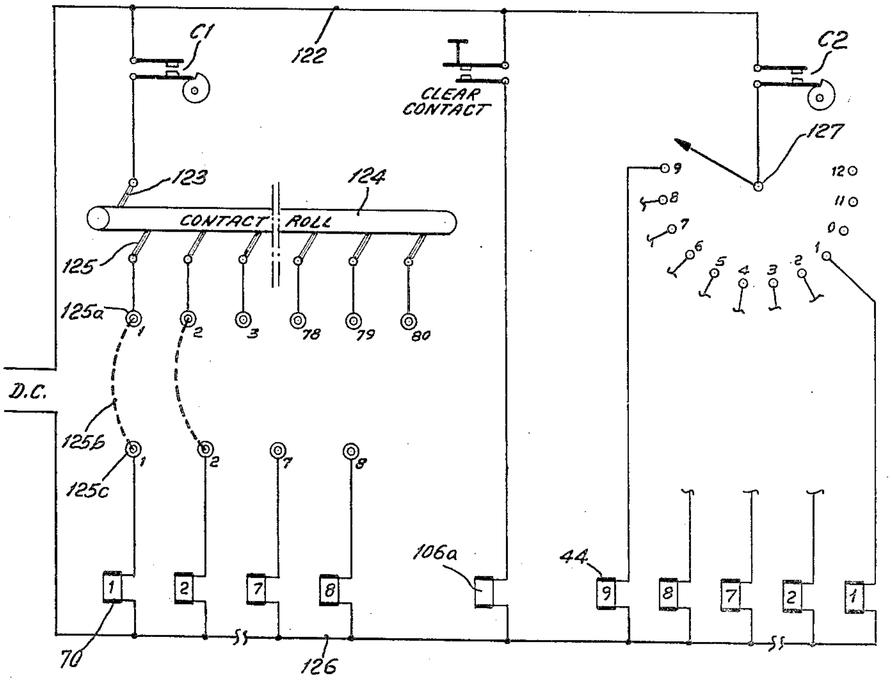
Fig. 6 is a wiring diagram showing the storage device in a system for concurrent numeric storage.

Fig. 6 of the drawings shows the storage device oriented in a control system for the entry of data into the storage device on a digit by digit or concurrent basis from cards in flight, in for example, a high speed reproducer or the like, such as shown in the Mills Patent No. 2,016,682. In this operation the action of the device is reversed so that the column magnets are under the control of card perforations while the digit magnets are under the control of a digit emitter.

In entering data from a perforated record card in concurrent fashion, all "9" index point positions of the card are presented to the sensing station first. Assuming that a perforation is found at the "9" index point position in the first column, a circuit will be established through such perforation to the first column magnet. This circuit involves line 122, cam contact C–1 which closes for each cycle point of machine operation, common brush 123, contact roll 124, sensing brushes 125, exit plug sockets **125*a*, plug wire 125*b*, entry plug sockets 125*c*, the first column magnet, and the line 126**. The related contact operating assembly is thereby shifted to bring the interposer pins thereof into alignment with the contact pins of the first storage zone and with the digit bails, the device being thereby conditioned for the storage of data into any one of the storage units of the zone.

A digit emitter 127 will thereafter complete a circuit to energize the "9" digit magnet 44, and operate its related digit bails 36. A typical circuit is established from line 122, through the cam contact C–2 which closes during the latter portion of each cycle point, to the digit emitter brush 127, through, for example, the "9" spot on the digit emitter to the "9" digit magnet 44 and to the line 126.

The two foregoing examples, therefore, illustrate the manner in which data may be stored in the device in column by column fashion on the one hand, and in concurrent fashion on the other hand. Information so stored may be read out from the storage device either column by column or concurrently.

Figure 7:
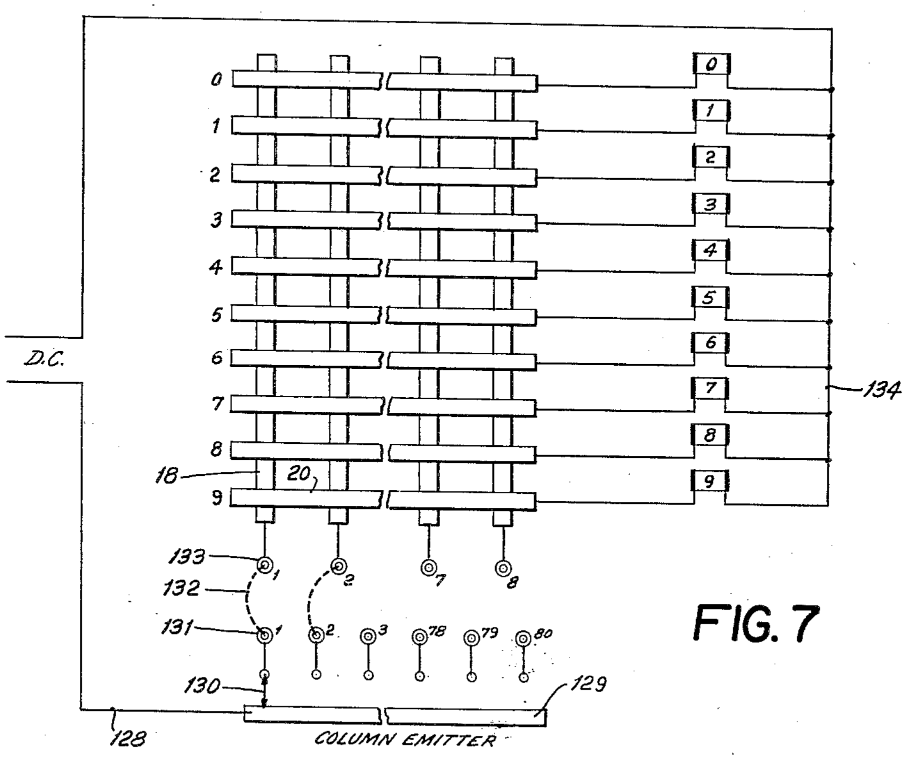
Fig. 7 is a wiring diagram of the storage device in a system for column by column numeric readout.

Fig. 7 of the drawing diagrammatically illustrates the orientation of the storage device in a system for column by column readout of the stored data as required by a step by step duplicator summary punch as shown in the Maul Patents Nos. 1,946,913 and 1,986,551.

A typical readout circuit extends from the line 128, to a column emitter strip 129, through a column emitter 130, through an exit socket 131, through a plug wire 132, through the entry socket 133, to the face contact strip 18 of the first storage zone, for example, through a closed contact pin 26 to the base strip 20 and to the digit magnet of a recording device such as the punch of the above noted Maul patents, and from thence to the line 134.

Figure 8:
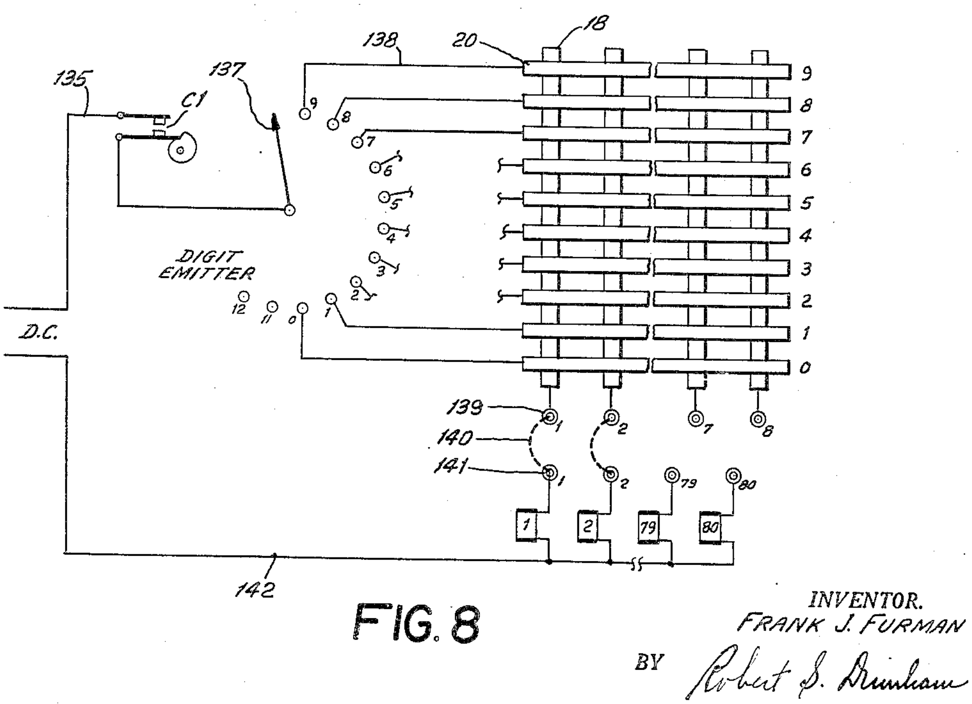
Fig. 8 is a wiring diagram of the storage device in a system for concurrent numeric readout.

Concurrent readout as required by summary punch reproducing such as shown in the Lake Reissue Patent No. 21,133 is achieved by a wiring arrangement such as diagrammatically shown in Fig. 8 of the drawings.

A typical concurrent readout circuit is established from the line 135, through a cam contact C-1 which closes at each digital index point position on the card, to a digit emitter brush 137, through the "9" spot on the emitter, for example, through the connection 138 to the base conductor strip 20, through a closed contact pin 28 to the intersecting face conductor strip 18 for column one, for example, to the outlet socket 139, through the plug wire 140, to the entry socket 141 and the column one magnet of a recording device of the type represented in the above noted Lake reissue patent, and to the line 142.

The storage device has been shown in one mechanical embodiment and in control systems requiring either column by column or concurrent entry and readout, and it is deemed therefore that modifications of the invention will appear to those skilled in the art. The enjoyment of the invention is, therefore, not to be limited to any particular environment since those shown herein are merely illustrative.

What is claimed is:

1. In a storage device, a contact plate having electrically separated conducting elements therein constituting a data storage zone, contact unit guide passages in said plate intersecting said conducting elements, a contact unit mounted in each of said passages for sliding movement in a single, fixed path into and out of bridging contact with said conducting elements, a pivoted contact operating bar spaced from and in alignment with each contact unit, a contact operating assembly disposed between said contact operating devices and the contact units of said storage zone, a plurality of axially sliding interposers mounted in said contact operating assembly in offset and axially spaced relation with respect to said contact operating bars and the contact units of said zone, means for confining the sliding movement of said interposers to a single fixed path, yielding means operative on each of said interposers for normally retaining them in axially spaced relation to said contact units, means for moving said contact operating assembly to align the interposers thereon with said contact operating bars and the contact units of said zone, and means for thereafter selectively operating said contact operating bars into operating contact with aligned interposers, thereby operating selected contact units.

2. In a storage device, a contact plate having electrically separated conducting elements therein constituting a data storage zone, contact unit guide passages in said plate intersecting said conducting elements, a contact unit mounted in each of said passages for sliding movement in a single, fixed path into and out of bridging contact with said conducting elements, a pivoted contact operating bar spaced from and in alignment with each contact unit, a contact operating assembly disposed between said contact operating devices and the contact units of said storage zone, a plurality of axially sliding interposers mounted in said contact operating assembly in offset and axially spaced relation with respect to said contact operating bars and the contact units of said zone, means for confining the sliding movement of said interposers to a single fixed path, yielding means operative on each of said interposers for normally retaining them in axially spaced relation to said contact units, means for moving said contact operating assembly to align the interposers thereon with said contact operating bars and the contact units of said zone, and electromagnetic means thereafter selectively operative on said contact operating bars to move said bars into operating contact with the aligned interposers, thereby operating selected contact units.

3. In a storage device, a contact plate having electrically separated conducting elements therein constituting a data storage zone, contact unit guide passages in said plate intersecting said conducting elements, a contact unit mounted in each of said passages for sliding movement in a single, fixed path into and out of bridging contact with said conducting elements, a contact operating device spaced from and in alignment with each contact unit, a contact operating assembly disposed between said contact operating devices and the contact units of said storage zone, a plurality of axially sliding interposers mounted in said contact operating assembly in offset and axially spaced relation with respect to said contact operating devices and the contact units of said zone, means for confining the sliding movement of said interposers to a single fixed path, yielding means operative on each of said interposers for normally retaining them in axially spaced relation to said contact units, electromagnetic means for moving said contact operating assembly to align the interposers thereon with said contact operating devices and the contact units of said zone, and electromagnetic means for thereafter selectively operating said contact operating devices into operating contact with the aligned interposers, thereby operating selected contact units.

4. In a storage device, a contact plate having electrically separated conducting elements therein constituting a data storage zone, contact unit guide passages in said plate intersecting said conducting elements, a contact unit mounted in each of said passages for sliding movement in a single, fixed path into and out of bridging contact with said conducting elements, a contact operating device spaced from and in alignment with each contact unit, a contact operating assembly disposed between said contact operating devices and the contact units of said storage zone, a plurality of axially sliding interposers mounted in said contact operating assembly in offset and axially spaced relation with respect to said contact operating devices and the contact units of said zone, means for confining the sliding movement of said interposers to a single fixed path, yielding means operative on each of said interposers for normally retaining them in axially spaced relation to said contact units, electromagnetic means for moving said contact operating assembly to align the interposers thereon with said contact operating devices and the contact units of said zone, means responsive to movement of said operating assembly for establishing a holding circuit for said electromagnetic means, and electromagnetic means for thereafter selectively operating said contact operating devices into operating contact with the aligned interposers, thereby operating selected contact units.

5. In a storage device, a contact plate having electrically separated conducting elements therein constituting a data storage zone, contact unit guide passages in said plate intersecting said conducting elements, a contact unit mounted in each of said passages for sliding movement in a single, fixed path into and out of bridging contact with said conducting elements, a contact operating device spaced from and in alignment with each contact unit, a contact operating assembly disposed between said contact operating devices and the contact units of said storage zone, a plurality of axially sliding interposers mounted in said contact operating assembly in offset and axially spaced relation with respect to said contact operating devices and the contact units of said zone, means for confining the sliding movement of said interposers to a single fixed path, yielding means operative on each of said interposers for normally retaining them in axially spaced relation to said contact units, electromagnetic means for moving said contact operating assembly to align the interposers thereon with said contact operating devices and the contact units of said zone, electromagnetic means for operating said contact operating devices into operating contact with the aligned interposers, and means for first energizing said first named electromagnetic means and for thereafter energizing said second named electromagnetic means, thereby operating selected contact units.

6. In a storage device, a contact plate having electrically separated conducting elements therein, rows of aligned contact unit guide passages constituting a plurality of data storage zones in said plate intersecting said conducting elements, a contact unit mounted in each of said passages for sliding movement in a single, fixed path into and out of bridging contact with said conducting elements, contact operating devices spaced from and in alignment with aligned contact units of adjacent storage zones, a contact operating assembly disposed between said contact operating devices and each of said storage zones, a plurality of axially sliding interposers mounted in each of said contact operating assemblies in offset and axially spaced relation with respect to said contact operating devices and the contact units of their respective storage zones, means for confining the sliding movement of said interposers to a single, fixed path, yielding means operative on each of said interposers for normally retaining them in axially spaced relation to said contact units, means for selectively moving said contact operating assemblies to align the interposers thereon with said contact operating devices and the contact units of their respective zones, and means for thereafter selectively operating said contact operating devices into operating contact with aligned interposers, thereby operating selected contact units.

7. In a storage device, a contact plate having electrically separated conducting elements therein, rows of aligned contact unit guide passages constituting a plurality of data storage zones in said plate intersecting said conducting elements, a contact unit mounted in each of said passages for sliding movement in a single, fixed path into and out of bridging contact with said conducting elements, pivoted contact operating bars spaced from and in alignment with aligned contact units of adjacent storage zones, a contact operating assembly disposed between said contact operating devices and each of said storage zones, a plurality of axially sliding, interposers mounted in each of said contact operating assemblies in offset and axially spaced relation with respect to said contact operating bars and the contact units of their respective storage zones, means for confining the sliding movement of said interposers to a single, fixed path, yielding means operative on each of said interposers for normally retaining them in axially spaced relation to said contact units, electromagnetic means for selectively moving said contact operating assemblies to align the interposers thereon with said contact operating bars and the contact units of their respective zones, and electromagnetic means for thereafter selectively operating said contact operating bars into operating contact with aligned interposers, thereby operating selected contact units.

8. In a storage device, a contact plate having electrically separated conducting elements therein, rows of aligned contact unit guide passages constituting a plurality of data storage zones in said plate intersecting said conducting elements, a contact unit mounted in each of said passages for sliding movement in a single, fixed path into and out of bridging contact with said conducting elements, pivoted contact operating bars spaced from and in alignment with aligned contact units of adjacent storage zones, a contact operating assembly disposed between said contact operating devices and each of said storage zones, a plurality of axially sliding, interposers mounted in each of said contact operating assemblies in offset and axially spaced relation with respect to said contact operating bars and the contact units of their respective storage zones, means for confining the sliding movement of said interposers to a single, fixed path, yielding means operative on each of said interposers for normally retaining them in axially spaced relation to said contact units, means for selectively moving said contact operating assemblies to align the interposers thereon with said contact operating bars and the contact units of their respective zones, and electromagnetic means thereafter selectively operative on said contact operating bars to move said bars into operating contact with aligned interposers, thereby operating selected contact units.

9. In a storage device, a contact plate having electrically separated conducting elements therein, rows of aligned contact unit guide passages constituting a plurality of data storage zones in said plate intersecting said conducting elements, a contact unit mounted in each of said passages for sliding movement in a single, fixed path into and out of bridging contact with said conducting elements, contact operating devices spaced from and in alignment with aligned contact units of adjacent storage zones, a contact operating assembly disposed between said contact operating devices and each of said storage zones, a plurality of axially sliding interposers mounted in each of said contact operating assemblies in offset and axially spaced relation with respect to said contact operating devices and the contact units of their respective storage zones, means for confining the sliding movement of said interposers to a single, fixed path, yielding means operative on each of said interposers for normally retaining them in axially spaced relation to said contact units, electromagnetic means for selectively moving said contact operating assemblies to align the interposers thereon with said contact operating devices and the contact units of their respective zones, means responsive to movement of said operating assemblies for establishing a holding circuit for their associated electromagnetic means, and electromagnetic means for thereafter selectively operating said contact operating devices to move said bars into operating contact with aligned interposers, thereby operating selected contact units.

10. In a storage device, a contact plate having electrically separated conducting elements therein, rows of aligned contact unit guide passages constituting a plurality of data storage zones in said plate intersecting said conducting elements, a contact unit mounted in each of said passages for sliding movement in a single, fixed path into and out of bridging contact with said conducting elements, contact operating devices spaced from and in alignment with aligned contact units of adjacent storage zones, a contact operating assembly disposed between said contact operating devices and each of said storage zones, a plurality of axially sliding interposers mounted in each of said contact operating assemblies in offset and axially spaced relation with respect to said contact operating devices and the contact units of their respective storage zones, means for confining the sliding movement of said interposers to a single, fixed path, yielding means operative on each of said interposers for normally retaining them in axially spaced relation to said contact units, means for moving said contact operating assemblies to align the interposers thereon with said contact operating devices and the contact units of their respective zones, electromagnetic means for operating said contact operating devices to move said bars into operating contact with aligned interposers, and means for first selectively energizing said first named electromagnetic means and for thereafter selectively energizing said second named electromagnetic means, thereby operating selected contact units.

11. In a storage device a data storage zone including a plurality of normally open contact units representative of significant digits and a normally closed contact unit representative of zero, a plurality of independent operating bails for closing said contact units representative of significant digits, means for selectively operating said operating means, and a zero bail in contact with and operative by each of said first named operating bails for opening said contact unit representative of zero.

12. In a storage device a data storage zone including a plurality of normally open contact units representative of significant digits and a normally closed contact unit representative of zero, a plurality of independent operating bails for closing said contact units representative of significant digits, electromagnetic means for selectively operating said operating means, and a zero bail in contact with and operative by each of said first named operating bails for opening said contact unit representative of zero.

FRANK J. FURMAN.

REFERENCES CITED

The following references are of record in the file of this patent:

UNITED STATES PATENTS

| Number | Name | Date |
|---|---|---|
| 1,098,095 | Carroll | May 26, 1914 |
| 2,070,824 | Boutet | Feb. 16, 1937 |
| 2,293,127 | Fishack | Aug. 18, 1942 |
| 2,369,430 | Brand et al. | Feb. 13, 1945 |
| 2,473,466 | Bitner | June 14, 1949 |